May 28, 1957   M. O. NIEMAN   2,793,463
FISHHOOK DISGORGER
Filed Aug. 5, 1955
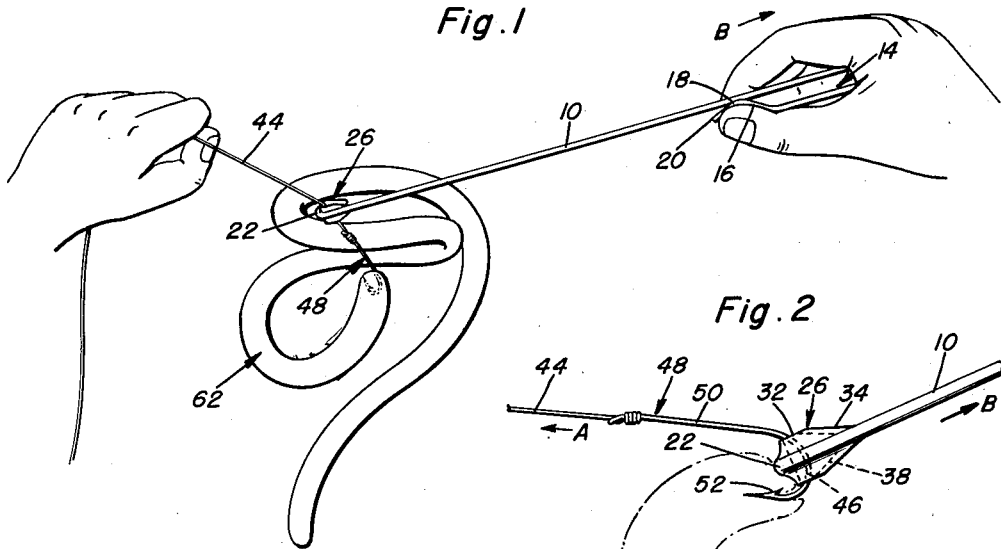
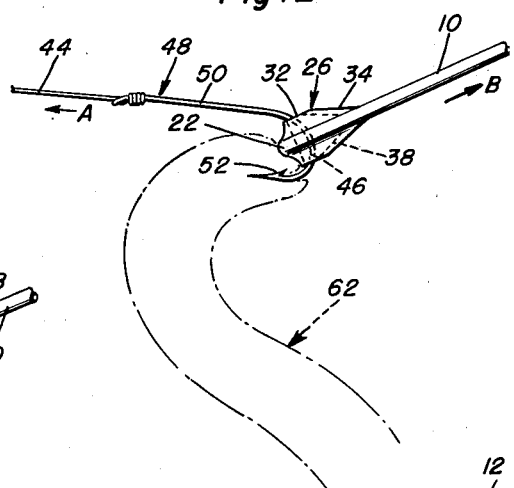
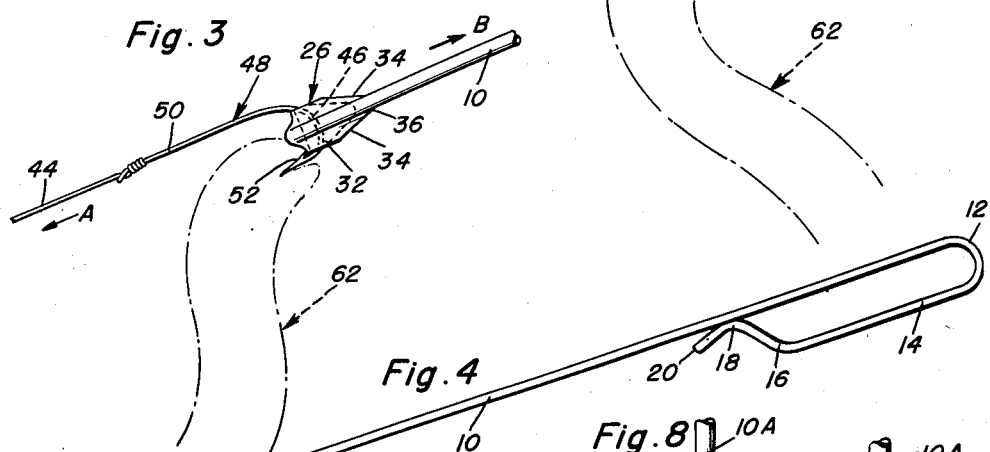
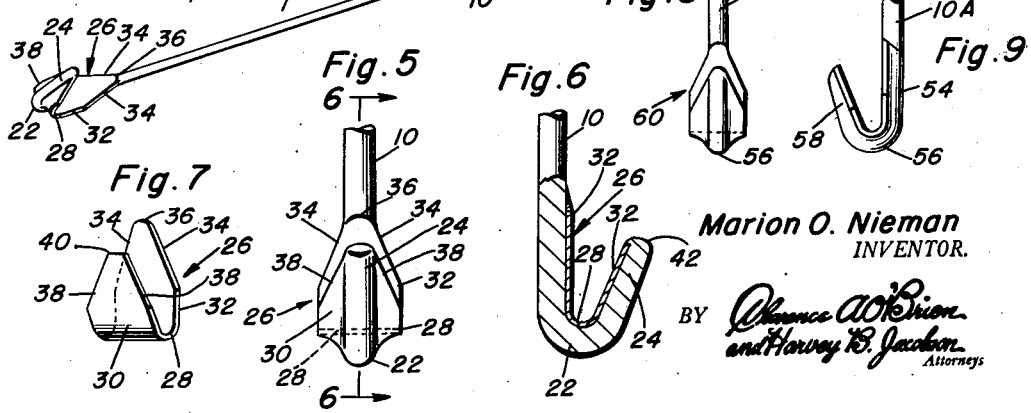
Marion O. Nieman
INVENTOR.

2,793,463
FISHHOOK DISGORGER

Marion O. Nieman, Shady Side, Md.

Application August 5, 1955, Serial No. 526,671

3 Claims. (Cl. 43—53.5)

This invention relates to an improved fishhook disgorger which is characterized by handle means having a novel hand grip at one end and novel fishhook engaging, manipulating, dislodging and extracting means at the other end.

More specifically, the invention comprises an elongated substantially rigid rod, one end of which is bent to form an elongated loop, said loop having a free end portion directed toward the rod proper at an oblique angle and formed with a bend bearing against said rod and a terminal which is angled obliquely from the rod to define and provide an easy-to-use hand grip and thumb seat, whereby to permit the rod to be employed as a push-pull implement, oscillated and otherwise manipulated to skillfully handle the fishhook dislodging and extracting means at the other end of the rod.

Another object of the invention is to provide a dislodging and extracting means which is characterized by a saddle having a crotch in which the bend of tht fishhook is lodged and effectually hooked, said saddle being substantially V-shaped in edge elevation, whereby the divergent wall portions thereof embrace the bend and junctional portion of the fishhook shank in a manner to twist, oscillate and otherwise maneuver the fishhook so that it may be expeditiously removed and retrieved.

Other objects, features and advantages will become more readily apparent from the following description and the accompanying drawing.

In the drawings:

Figure 1 is a perspective view illustrating the improved fishhook disgorger and the manner in which the same and line are held to engage the extracting means with the line as a first step in removing the fishhook;

Figure 2 is a slightly enlarged perspective view with the implement fragmentarily shown and with the fishhook partially withdrawn;

Figure 3 is a view in perspective similar to Figure 2 showing a further operational step;

Figure 4 is a perspective view of the implement by itself illustrating one embodiment of the dislodging and extracting means;

Figure 5 is fragmentary view on an enlarged scale of the stated means in elevation;

Figure 6 is a fragmentary sectional view on the line 6—6 of Figure 5;

Figure 7 is a perspective view of the saddle-forming clip;

Figure 8 is a view similar to Figure 5 showing a modification wherein the dislodging and extracting means are cast together; and Figure 9 is a view at right angles to Figure 8.

Reference will be had first to Figures 1 to 6, inclusive. Referring now to Figure 4, the aforementioned rod is denoted by the numeral 10. This is, in practice, approximately twelve inches, more or less, in length. The cross-section is slightly less than a quarter of an inch. One end of the rod is bent upon itself, as at 12, into a return bend, and the adjacent portion 14 is linearly straight and parallel to the rod proper, and the free end portion is fashioned into an oblique angled bend 16, then into a curvate bend 18 and is then formed into an outwardly flared terminal 20 at an oblique angle to the rod proper. These three portions, 16, 18 and 20, provide a substantially V-shaped thumb seat, as shown in Figure 1. The loop proper provides a hand grip, making it possible to manipulate th rod as a push-pull member or to oscillate it or to otherwise handle it for satisfactory disgorging results.

The other end of the rod is formed with a return bend 22 (Figure 6) and an oblique angled portion 24 to, in this manner, define what may be described as a hook. Because of the relatively small cross-section of the hook, portions 22 and 24, the metal does not lend itself to flattening to form the desirably wide jaw means thought to be necessary for effectually manipulating the hook in the manner shown in Figures 2 and 3. Therefore, a relatively rigid but thin sheet metal clip or cleat 26 is provided and welded, soldered or otherwise fixed in the extracting hook. This clip is generally V-shaped in edge elevation, and the central bend thereof provides a fishhook seating crotch 28 while the divergent wall portions 30 and 32 function as will now be explained. That is to say, the shank 10 and bends 22 and 24 embrace the exterior surfaces of the walls somewhat centrally between the lengthwise edges thereof. The projecting edge portions thus define flanges, at least one of which functions as a thrust abutment, as illustrated in Figure 3. The free end portion of wall 32 is generally V-shaped with the edge portions 34 converging toward a tip 36. This end portion may be said to be tapered, and the tip is lined up with the shank, as shown in Figure 5. The corresponding edge portions 38 of the wall portion 30 converge toward a truncated tip 40 which is substantially flush with the tip 42 of the bend 24. These edges facilitate piloting the dislodging means on the fish line 44 in the manner illustrated in Figure 1. Not only does the cleat or clip 26 serve as a reinforcement for the hook means 22 and 24, it is primarily a seating and manipulating saddle for the curvate bend 46 of the fishhook 48 as illustrated in Figures 2 and 3. The shank of the hook is denoted at 50, and the usual barb at 52. Under certain operating conditions, the barb may be engaged with the adjacent projecting flange of the saddle for thrust and other fishhook removing steps. The saddle or cleat is of a width so that it bridges the space between the shank 50 and barbed terminal 52 and as a matter of fact, tends to catch hold of the junctional portion between the shank 50 and bend 46. This provides a grip or hold, and therefore the means 26 is not only a saddle but is in effect a twisting and oscillating jaw.

Instead of fashioning the end portion of the rod into the hook means 22 and 24 and applying a separate cleat 26 and welding the same in the hook or to the hook, it may be desirable from the manufacturer's point of view to employ a hook of cast metal, for example, the hook seen in the modification in Figure 9 which includes a shank 54 welded or otherwise connected to the rod shank 10A, this cast portion including a bend 56 and a terminal 58, which features together define a hook. It is within the purview of the invention to weld the cleat 26 to this hook or to form the saddle or cleat as a part of the casting. This saddle is here denoted by the numeral 60, and since it is the same, structurally speaking, as the clip or cleat 26, it is thought to be unnecessary to describe it in detail. Thus, the dislodging and extracting means may be of composite construction, as shown in Figures 1 to 6, inclusive, or of one-piece cast construction, as shown in Figures 8 and 9. Fundamentally, both are the same in construction, purpose and function.

The invention may be used for catching hold of and dislodging fishhooks from the mouth of a fish. In the drawings, the invention is shown as it applied and maneuvered in Figures 1, 2, and 3, respectively, and the victim here is an eel 62.

The manner of holding the line and implement is shown and the directions of pull are denoted by the arrows A and B.

The foregoing is considered as illustrative only of the principles of the invention. Further, since numerous modifications and equivalents will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishhook disgorger comprising an elongated substantially rigid rod having an elongated loop at one end, said loop having a free end portion directed toward the rod, formed with a bent portion bearing against said rod and a terminal portion angled obliquely from the rod and thus providing a hand grip and thumb seat, the other end of said rod having a return bend formed therein defining a blunt-ended hook, a relatively thin but rigid V-shaped clip seated midway of its lengthwise edges in the crotch of said hook and having its median lengthwise portion fixed to said hook, said clip defining a saddle having a central crotch portion and divergent inward and outward wall portions, the lengthwise edges of the wall portions projecting beyond the centralized portions of said hook and providing sharp-edged flanges, and the respective end portions of said wall portions being gradually decreased in width and thus tapered to facilitate cooperative use in piloting the clip on the fishing line and sliding the same along the fishing line and also the shank of the fishhook.

2. A fishhook disgorger through the medium of which an eel actually assists in extracting the fishhook and the fishhook may be retrieved substantially intact comprising a rigid elongate rod substantially cylindrical in cross-section and having handle means at one end, the opposite end of said rod having a return bend formed therein fashioned into a hook the terminal portion of which is at an approximate oblique angle relative to the axis of the rod and the extreme terminal being blunt, a relatively thin but rigid sheet metal clip V-shaped in edge elevation and embodying a central crotch portion and opposed divergent wall portions, the free terminal end portions of said wall portions being decreased in width and providing marginal edges tapering to substantially blunt vertex portions, the crotch portion of the clip being seated in the return bend, one wall being superimposed upon and secured centrally between its lengthwise edges to the terminal portion of the hook, the other wall being likewise superimposed upon and secured intermediate its longitudinal edges to the portion of the shank adjacent to said return bend.

3. The structure defined in claim 2 and wherein the lengthwise marginal edge portions of said divergent wall portions constitute lip-like cutting flanges, and one end of said crotch portion being so shaped that it is adapted to serve as a thrust abutment when it is intentionally and directly pressed into engagement with the usual barb at the terminal of the curvate bend of the fishhook.

References Cited in the file of this patent

UNITED STATES PATENTS

| | | |
|---|---|---|
| 498,094 | Verharen | May 23, 1893 |
| 1,513,400 | Koski | Oct. 28, 1924 |
| 2,541,331 | Boyd | Feb. 13, 1951 |

FOREIGN PATENTS

| | | |
|---|---|---|
| 470,220 | Great Britain | Aug. 11, 1937 |